United States Patent
Zuromski et al.

(10) Patent No.: US 9,317,622 B1
(45) Date of Patent: Apr. 19, 2016

(54) METHODS AND SYSTEMS FOR FRAGMENTING AND RECOMBINING CONTENT STRUCTURED LANGUAGE DATA CONTENT TO REDUCE LATENCY OF PROCESSING AND RENDERING OPERATIONS

(75) Inventors: Joseph Alexander Zuromski, Mountain View, CA (US); Hao Hu, Belmont, CA (US); Palanidaran Chidambaram, Tamil Nadu (IN); Surendran Rangasamy, Tamil Nadu (IN); Fei Wang, Fremont, CA (US); Christopher Allan White, Redwood City, CA (US)

(73) Assignee: Amazon Technologies, Inc., Reno, NV (US)

( * ) Notice: Subject to any disclaimer, the term of this patent is extended or adjusted under 35 U.S.C. 154(b) by 534 days.

(21) Appl. No.: 12/892,771

(22) Filed: Sep. 28, 2010

Related U.S. Application Data (60) Provisional application No. 61/374,464, filed on Aug. 17, 2010.

(51) Int. Cl.
*G06F 17/00* (2006.01)
*G06F 17/30* (2006.01)
*G06F 17/22* (2006.01)

(52) U.S. Cl.
CPC ...... *G06F 17/30905* (2013.01); *G06F 17/2247* (2013.01); *G06F 17/2229* (2013.01)

(58) Field of Classification Search
CPC .................. G06F 17/30905; G06F 17/2247
USPC .................................................. 715/240, 248
See application file for complete search history.

(56) References Cited

U.S. PATENT DOCUMENTS

| | | | | |
|---|---|---|---|---|
| 5,898,836 | A * | 4/1999 | Freivald | G06F 17/3089 707/E17.116 |
| 7,516,402 | B2 * | 4/2009 | Koivisto | G06F 17/212 715/204 |
| 7,721,197 | B2 * | 5/2010 | Baudisch | G06F 3/0481 715/204 |
| 7,783,642 | B1 * | 8/2010 | Feng | G06F 17/30896 706/55 |
| 8,020,090 | B2 * | 9/2011 | Chen et al. | 715/238 |
| 8,214,376 | B1 * | 7/2012 | Jordan | G06F 17/30336 707/755 |
| 8,751,925 | B1 * | 6/2014 | Zhang | G06F 17/227 715/234 |
| 2003/0137522 | A1 * | 7/2003 | Kaasila | G06T 3/4015 345/619 |
| 2003/0200175 | A1 * | 10/2003 | Wang | G06Q 20/10 705/50 |
| 2004/0046789 | A1 * | 3/2004 | Inanoria | G06F 8/38 715/748 |
| 2004/0205609 | A1 * | 10/2004 | Milton | G06F 17/30867 715/248 |
| 2005/0022115 | A1 * | 1/2005 | Baumgartner | G06F 17/30911 715/205 |
| 2005/0028077 | A1 * | 2/2005 | Wen | G06F 17/218 715/272 |
| 2005/0108266 | A1 * | 5/2005 | Cao | G06F 17/2229 |

(Continued)

*Primary Examiner* — Scott Baderman
*Assistant Examiner* — Benjamin J Smith
(74) *Attorney, Agent, or Firm* — Sutherland Asbill & Brennan LLP (57) ABSTRACT

Content may be stored as structured language data that may be separated into a formatting skeleton (skeleton) and fragments. The skeleton may be extracted from the structured language data to retain at least a portion of the formatting information of a structured language data. The fragments may be segments of presentation data from the structured language data and may be mapped to a location within the skeleton. Upon rendering, a client device may only have to load the skeleton and one or more fragments associated with a specified viewing location in order to quickly and accurately render a portion of the content. By rendering only some of the fragments of the structured language data, the client device may minimize user-perceived latency during processing and rendering operations.

18 Claims, 5 Drawing Sheets

(56) References Cited

U.S. PATENT DOCUMENTS

| | | | | |
|---|---|---|---|---|
| 2005/0114435 A1* | 5/2005 | DiPlacido | H04L 69/329 | 709/202 |
| 2005/0195221 A1* | 9/2005 | Berger | G06F 3/0481 | 345/660 |
| 2005/0210531 A1* | 9/2005 | Bertin | H04N 7/167 | 725/143 |
| 2006/0143182 A1* | 6/2006 | Meadows | G06F 8/38 | |
| 2006/0149726 A1* | 7/2006 | Ziegert | G06F 17/30905 | |
| 2006/0149775 A1* | 7/2006 | Egnor | G06F 17/2264 | |
| 2006/0282445 A1* | 12/2006 | Chen | G06F 17/30905 | |
| 2006/0287989 A1* | 12/2006 | Glance | G06F 17/30587 | |
| 2007/0186182 A1* | 8/2007 | Schiller | G06F 17/30899 | 715/781 |
| 2007/0300258 A1* | 12/2007 | O'Connor | A23L 1/3002 | 725/44 |
| 2008/0209314 A1* | 8/2008 | Sylthe | G06F 17/217 | 715/273 |
| 2008/0275901 A1* | 11/2008 | Chakrabarti | G06F 17/30864 | |
| 2009/0070413 A1* | 3/2009 | Priyadarshan | G06F 17/2247 | 709/203 |
| 2009/0177959 A1* | 7/2009 | Chakrabarti | G06F 17/2229 | 715/234 |
| 2009/0210780 A1* | 8/2009 | Oshima | G06F 17/30961 | 715/234 |
| 2009/0248608 A1* | 10/2009 | Ravikumar | G06F 17/30905 | 706/55 |
| 2009/0327338 A1* | 12/2009 | Zhao | G06F 17/30882 | |
| 2010/0257440 A1* | 10/2010 | Kshirsagar | G06F 17/30896 | 715/230 |
| 2011/0055314 A1* | 3/2011 | Rosenstein | G06F 17/30899 | 709/203 |
| 2011/0055683 A1* | 3/2011 | Jiang | G06F 17/30899 | 715/234 |
| 2011/0145287 A1* | 6/2011 | Jiang | G06F 17/30905 | 707/780 |
| 2011/0191407 A1* | 8/2011 | Fu | G06F 8/38 | 709/203 |
| 2012/0005686 A1* | 1/2012 | Rajan | G06F 17/2241 | 718/105 |
| 2012/0036264 A1* | 2/2012 | Jiang | G06F 17/30902 | 709/226 |
| 2012/0042090 A1* | 2/2012 | Chen | H04L 65/607 | 709/231 |
| 2014/0033010 A1* | 1/2014 | Richardt | G06F 17/217 | 715/222 |

* cited by examiner

METHODS AND SYSTEMS FOR FRAGMENTING AND RECOMBINING CONTENT STRUCTURED LANGUAGE DATA CONTENT TO REDUCE LATENCY OF PROCESSING AND RENDERING OPERATIONS

CROSS REFERENCE TO RELATED PATENT APPLICATIONS

This application claims the benefit of U.S. Provisional Application No. 61/374,464, entitled "Fragmentation of Structured Language Data", filed Aug. 17, 2010, which provisional application is incorporated herein by reference.

BACKGROUND

Content is increasingly distributed in electronic form to an array of users for use on a variety of computing devices. The content may include media such as books, magazines, newspapers, newsletters, manuals, guides, references, articles, reports, documents, blogs, or any other type of content that includes text, images, audio, and/or video. A file size of content may widely vary based on a file type used to store the content, a length of the content, an amount of formatting information, and for other reasons. The formatting information may prescribe the look and feel of underlying data (e.g., text, images, video, tables, etc.) of the content. In some instances, the formatting information may be complex and consist of a significant portion of an overall byte size of the content. For example, a few hundred page document that includes many tables, fonts, text sizes, and other formatting information may dedicate a significant portion of the file information to the formatting information. Often, it is important to accurately preserve this formatting information to enable rendering the content as intended by a publisher or other source of the content.

The computing devices that ultimately access the content may have different performance characteristics based on their respective hardware resources (e.g., processors, memory, etc.). Some computing devices may be able to access the content, but may perform in a manner that is less than ideal (e.g., have user-perceived latency when processing tasks, etc.) due to slow processors, limited bandwidth, or other reasons.

Generally, people prefer their computing devices to access desired content in a quick, efficient, and predictable manner regardless of the size of content and the particular type of computing device used to access the content. In particular, people desire immediate or substantially immediate access to user-specified portions of content regardless of the content size, type, and/or performance characteristics of the computing device that loads and renders the content. For example, a user may become frustrated when the computing device takes noticeably longer to access a first piece of content than it does to access a second piece even though the difference may be justified by a size of the pieces of content (e.g., first piece is much small than the second piece, and thus faster to load on the computing device). Similarly, the user may become frustrated when the computing device takes noticeably longer to access a piece of content because of a processing speed of the computing device (slow processing speed versus another computing device having a fast processing speed).

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, a file size of content may vary based on a number of factors such as a file type used to store the content (e.g., compression ratio, etc.), a length of the content (e.g., amount of text, images, etc.), an amount of formatting information, and for other reasons. Thus, two pieces of content having different file sizes may potentially require substantially different amounts of time for a computing device to render each of the respective pieces of content. For example, a first piece of content (e.g., a book) may take noticeably longer to render than a second piece of content (e.g., a magazine), which may be rendered without user-perceivable latency (wait time). In particular, when a user jumps to a specified location within a document using conventional rendering techniques, the user may experience a variance in latency or potentially no latency depending on the particular content accessed by the user.

In accordance with this disclosure, the content may be structured language data that may be separated into a formatting skeleton (skeleton) and fragments. The skeleton may be extracted from the structured language data to retain the formatting information of a structured language data. The skeleton may enable creation of a document object model (DOM) that omits the presentation data, but includes most or all of any relevant cascading style sheets (CSS), JavaScript, and other formatting information stored in the formatting information of the structured language data. The skeleton may be quickly parsed and loaded as the DOM. The DOM may include nodes that are subsets of the DOM that, when populated with the presentation data from the fragments, contain text, images, video application, or other content. The fragments may be segments of the presentation data that are mapped to a location within the skeleton. In some instances, the fragments may include some formatting information along with the presentation data, and thereby supplement formatting information of the skeleton. Upon rendering, a client device may only have to load a fragment associated with a specified viewing location in order to quickly and accurately render content with the skeleton at the viewing location. By rendering only some of the fragments of the structured language data, the client device may minimize user-perceived latency during processing and rendering operations.

In contrast, to achieve similar results, traditional techniques would have to render the entire structured language data (including all the fragments) which may compromise processing time (creates latency). Alternatively, traditional techniques may only render a specified portion from the structured language data and skip or omit preceding formatting information, which may compromise formatting accuracy.

In some embodiments, the computing device may continue to process additional fragments that are located proximate (or otherwise associated with) a selected fragment to expedite rendering of content of the additional fragments. Thus, when the user advances or otherwise navigates from the selected fragment (e.g., selects next page, scrolls further down, accesses a link on the selected fragment, etc.), the additional fragments are rendered without user-perceived latency.

The techniques and systems described herein may be implemented in a number of ways. Example implementations are provided below with reference to the following figures.

Illustrative Environment

Figure 1:
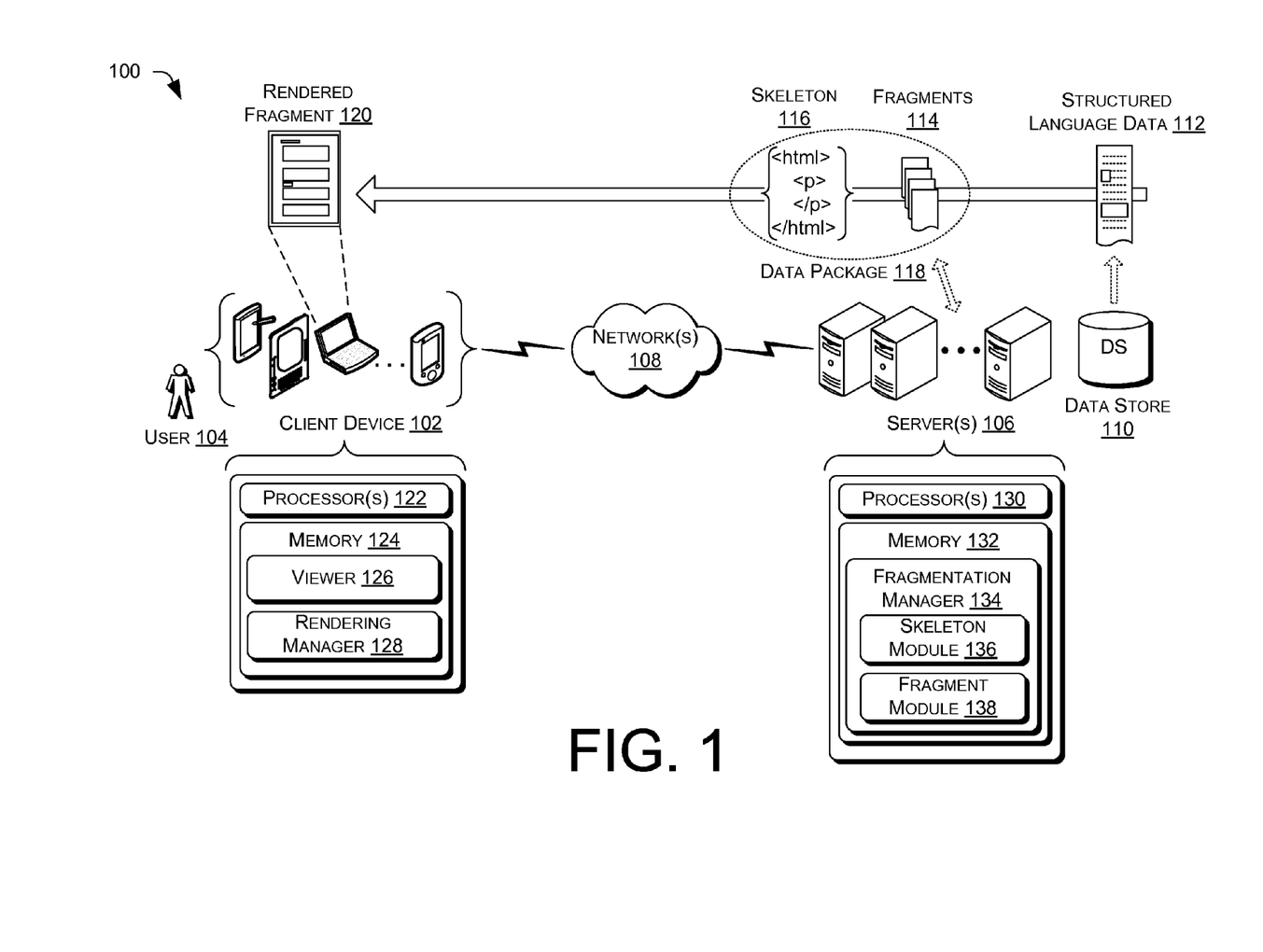
FIG. 1 is a schematic diagram of an illustrative computing environment to expedite rendering of content using a formatting skeleton and fragments of data derived from structured language data.

FIG. 1 is a schematic diagram of an illustrative computing environment 100 to expedite rendering of content using a formatting skeleton and fragments of data derived from structured language data. The environment 100 may include a client device 102 that may be implemented as one or more of a personal computer, a tablet computer, a mobile telephone, a portable digital assistant (PDA), and electronic book reader, a television, a set-top box, a game console, and/or other computing devices. A user 104 may interact with the client device 102 to perform functions, such as view content that is stored as structured language data, among other possible tasks.

In some embodiments, the client device 102 may interact with server(s) 106 via one or more network(s) 108, such as wired or wireless networks. The server(s) 106 may serve data to the client device 102 in response to a request from the client device 102. The server(s) 106 may include a data store 110 that stores structured language data 112, such as hypertext markup language (HTML) data, extensible markup language (XML), JavaScript object notation (JSON), and other structured language data that enable non-linear access and have a tree-based data structure. The structured language data may include formatting information and presentation data (e.g., text, images, videos, application, etc.), which is subject to the formatting information.

In accordance with one or more embodiments, the server(s) 106 may generate fragments 114 by segmenting the presentation data of the structured language data 112 into discrete segments or divisions. The fragments 114 may include a minimum and/or a maximum byte size or other characteristics the influence a file size of the fragments 114. In some embodiments, the fragments 114 may include enough data that, when rendered, fills a viewport of the client device 102. Thus, the user 104 may specify a viewing location of the content, which may be fulfilled by rendering an associated fragment that fills the viewport on the client device 102 without rendering all of the fragments 114 generated from the structured language data 112.

In various embodiments, the server(s) 106 may extract a formatting skeleton (skeleton) 116 from the formatting information of the structured language data 112. The skeleton 116 may include basic formatting information, such as paragraph start and stop indicators (e.g., <p>, </p>), table definitions (e.g., <table>, <tr>, <td>, etc.) and so forth that format data contained in the fragments. The skeleton 116 may be used to accurately provide formatting for one or more of the fragments 114 without rendering all preceding fragments (preceding data as arranged in the structured language data 112), when rendered by the client device 102.

The server(s) 106 may transmit the fragments 114 and the skeleton 116 as a data package 118 to the client device 102. The data package 118 may be a database structure that includes the fragments 114 and the skeleton 116 or may include a collection of files (e.g., zip files, folder/sub-folder structure, etc.). Upon receipt, the client device 102 may store the data package 118 for immediate or subsequent retrieval. Ultimately, the client device 102 may render the content as a rendered fragment 120 by selecting one or more fragment(s) of the fragments 114 and formatting the selected fragment(s) based on the formatting information of the skeleton 116. Accordingly, the rendered fragment 120 may be rendered to accurately reflect an intended presentation (formatting characteristics) of the data without rendering all the data (i.e., fragments) prior to the selected fragments(s).

As shown in FIG. 1, the client device 102 may include processor(s) 122 and memory 124. The memory 124 may store a viewer 126, which may be software application that enables viewing the rendered fragment 120, such as a browser or other application. The memory 124 may also include a rendering manager 128, which may be used in part by the viewer 126 to compile the rendered fragment, such as by combining one or more of the fragments 114 with the skeleton 116 to enable accurate rendering of the one or more of the fragments 114 in accordance with formatting information stored by the skeleton 116.

In various embodiments, the server(s) 106 may include one or more processor(s) 130 and memory 132. The memory 132 may store a fragmentation manager 134 that generates the fragments 114 and the skeleton 116 from the structured language data 112. In some embodiments, the fragmentation manager 134 may include a skeleton module 136 to generate the skeleton 116 and a fragment module 138 to generate the fragments 114 from the structured language data 112. The fragment module 138 may generate attributes for the fragments 114 that enable retrieval of the fragments and mapping of each of the fragments to the skeleton 116, among other possible information stored in each of the fragments 114. Additional details of the operation of the fragmentation manager 134, the skeleton module 136, and the fragment module 138 are provided below, and specifically with reference to FIGS. 3-5.

In some embodiments, the fragmentation module 134 and/or some or all of the related modules may be stored and executed from the memory 124 of the client device 102. For example, the client device 102 may receive the structured language data 112 from the server(s) 106. The client device 102 may then process the structured language data 112 to generate the fragments 114 and skeleton 116 (cumulatively the data package 118) for subsequent or immediate access.

Illustrative Operation

Figure 2:
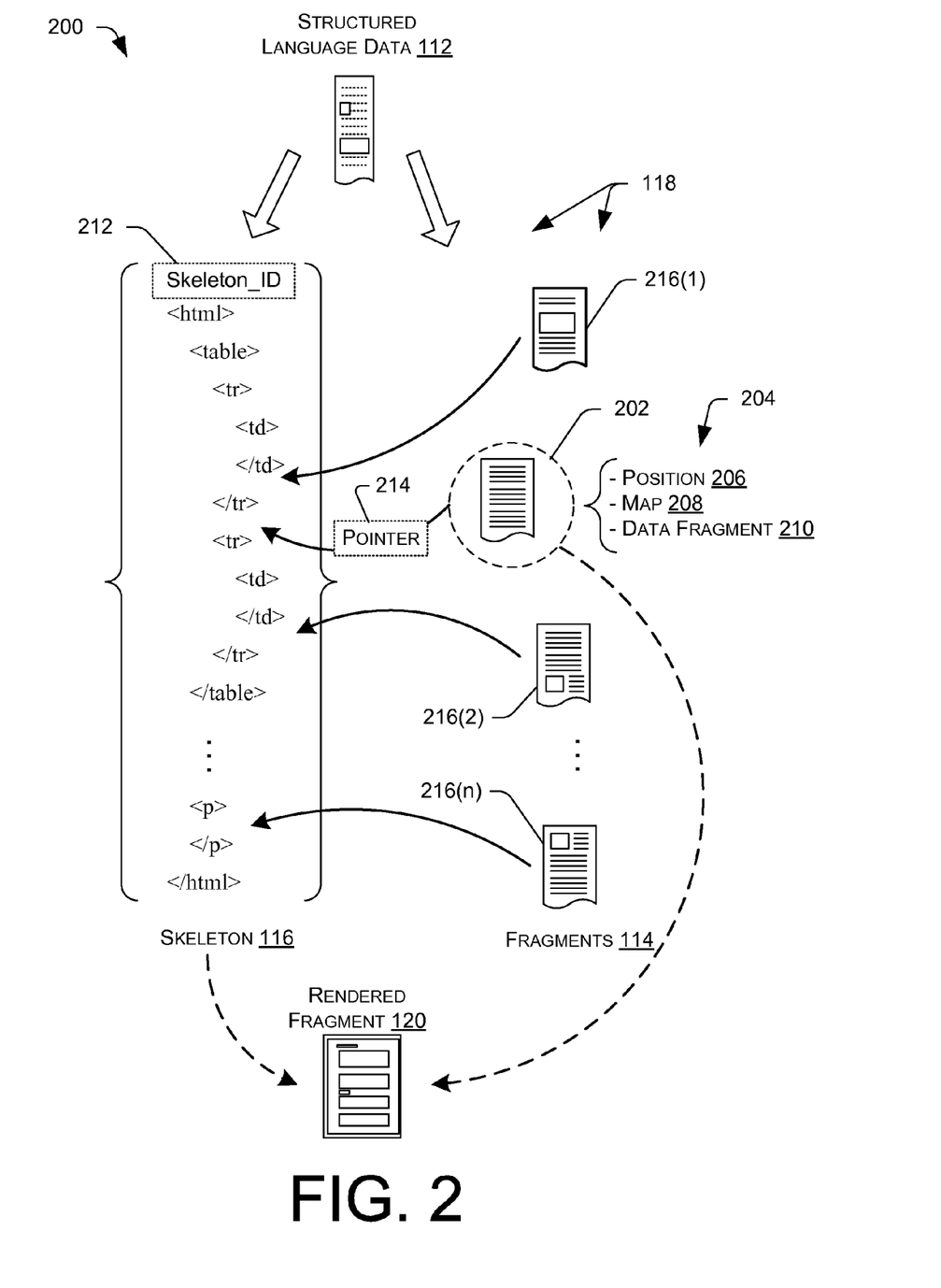
FIG. 2 is a pictorial flow diagram of an illustrative process to convert structured language data into fragments and a formatting skeleton, which may then be used to render one or more of the fragments without rendering all the fragments.

FIG. 2 is a pictorial flow diagram of an illustrative process 200 to convert structured language data into fragments and a formatting skeleton, which may then be used to render one or more of the fragments without necessarily rendering all the fragments. Initially, the structured language data 112 may include both presentation data (text, images, video, applications, etc.) and formatting instructions that are integrated with the presentation data. When the structured language data 112 is processed to render content for viewing by the user 104, all the presentation data that precedes a specified viewing location of the content typically has to be processed by the client device 102 to accurately format the content. When the specified viewing location is a location other than the beginning of the content, then the client device 102 may have to process a large amount of data, possibly greater than 250 kb of data, which may result in user-perceived latency due to processing speed limitations by the client device 102, network bandwidth, or other reasons. Even when the structured language data 112 is stored in multiple files, such as by chapters of an electronic book (eBook), the client device 102 has to process the files sequentially to ensure a proper format of a specified viewing location of the content.

In accordance with various embodiments, the structured language data 112 may be used to generate the fragments 114 and the skeleton 116. The client device may then parse and load the skeleton and render a portion of the fragments 114 to make a specified viewing location of the content viewable by the user 104 without user-perceived latency in the parsing, loading, and rendering operations. The specified viewing location may be a location that is requested by a user, such as a particular chapter, page, byte position, or other location. For illustrative purposes, the byte position is used as a representative way to identify a fragment for the specified viewing location; however, other techniques may be used to achieve the same or similar results.

In some embodiments, the skeleton 116 may contain some or all of the formatting information of the structured language data 112. For example, when the structured language data 112 is HTML, then the skeleton 116 may contain some or all of the HTML tags (e.g., <html>, <p>, <table>, <h1>, etc.) used to format the presentation data in the structured language data. The skeleton 116 may exclude the presentation data, such as text, images, videos, and so forth, and thus only the skeleton may only require a fraction of the byte size required to store the structured language data 112. In some instances, the skeleton 116 may require fewer than 250 kb of storage space, which may allow the client device 102 to quickly process (parse/load) the skeleton without user-perceivable latency. However, the client device 102 will also have to process at least one fragment with the skeleton 116 to provide content to the user 104, as discussed below.

The fragments 114 are small divisions of the presentation data of the structured language data 112. In some embodiments, a size of the fragments 114 is selected to enable a selected fragment to fill an entire viewport when the fragments are rendered by the client device 102. In this way, the rendered fragment may provide enough of the content to initially satisfy the user 104, such as by rendering a full page of the content for the user's consumption without user-perceived latency. In some instances, a plurality of fragments may be used to fill the viewport, such as when the fragments are small and cannot individually fill the viewport.

The fragments 114 may or may not include formatting information. In some embodiments, the fragments 114 may include intermediate formatting instructions, such as formatting instructions within a table (e.g., <tr>, <td>, etc.), or other types of intermediate formatting instructions that may or may not be included in the skeleton 116. Thus, the skeleton 116 (e.g., hybrid skeletons, etc.) may not have to include all the formatting instructions when the fragments include some formatting instructions as long as all necessary formatting instructions are retained between the fragments 114 and the skeleton 116 to enable accurate rendering of the content. In various embodiments, the fragments 114 may include all the formatting instructions (duplication with the skeleton 116), which may simplify rendering the content of the fragment once the fragment is rendered using the skeleton.

As shown in FIG. 2, a fragment 202 (or possibly a plurality of fragments) may be selected by the user 102 based on a specified viewing location. For example, the user 104 may specify the viewing location by inputting a byte position into a user interface via the client device 102, selecting the viewing location from an index, table of contents, or other list, or by other user inputs. The user input may be mapped to a respective byte position of the content. The fragment 202 may then be identified based on the byte position (or other identification information).

In some embodiments, the fragment 202 may include attributes 204 to locate and position the fragment with the skeleton 116. The attributes 204 may include a position 206, a map 208, and a data fragment 210. The position 206 may be the byte position that includes a span (e.g., 2030 bytes with a span of 126 bytes, etc.), a start and end position (e.g., 2030 bytes to 2154 bytes), or other similar representations that enable location of the fragment based on a specified viewing location (e.g., an input of 2045 bytes would identify the example fragment above). The map 208 may map the fragment 202 to a location (e.g., a node, etc.) within a skeleton, such as by specifying a skeleton identification (ID) 212 associated with the skeleton 116 and a pointer 214 that specifies a location within the specified skeleton. Thus, when multiple instances of the skeleton 16 are employed, such as during a use of sub-skeletons (as discussed in FIG. 4), the associated skeleton may be identified for the fragment 202 based on the map 208. The pointer 214 may specify a placement of the fragment within the skeleton 116. The pointer 214 may be specified using XML Path Language (Xpath), which is a query-based language for selecting a position within the skeleton (e.g., nodes within a DOM). Finally, the data fragment 210 may include the presentation data (e.g., text, images, videos, and/or applications, etc.) in the fragment that is absent in the skeleton 116.

To render the content at the viewing location specified by the user, the client device 102, via the rendering manager 128, may first load the skeleton 116 without the presentation data (i.e., without any of the fragments 114). In some embodiments, the rendering manager 128 may parse the skeleton 116 to create a DOM with nodes. The rendering manager 128 may identify the fragment 202 by mapping an inputted byte position with the position 206. The rendering manager 128 may then map the fragment 202 to the skeleton 116 (or DOM), such as by using the skeleton ID 212 and the pointer 214. Finally, the rendering manager 128 may render the fragment 202 in accordance with the formatting information in the skeleton 116 to accurately render the content as the rendered fragment 120 for viewing by the user 104. Thus, the rendering manager 128 renders the rendered fragment 120 based at least in part on the skeleton 116 and the fragment 202, but excludes at least some of the other fragments, such as fragments 216(1), 216(2), and 216(n), which may be unnecessary in order to provide the user 104 with the content at the specified viewing location.

Figure 3:
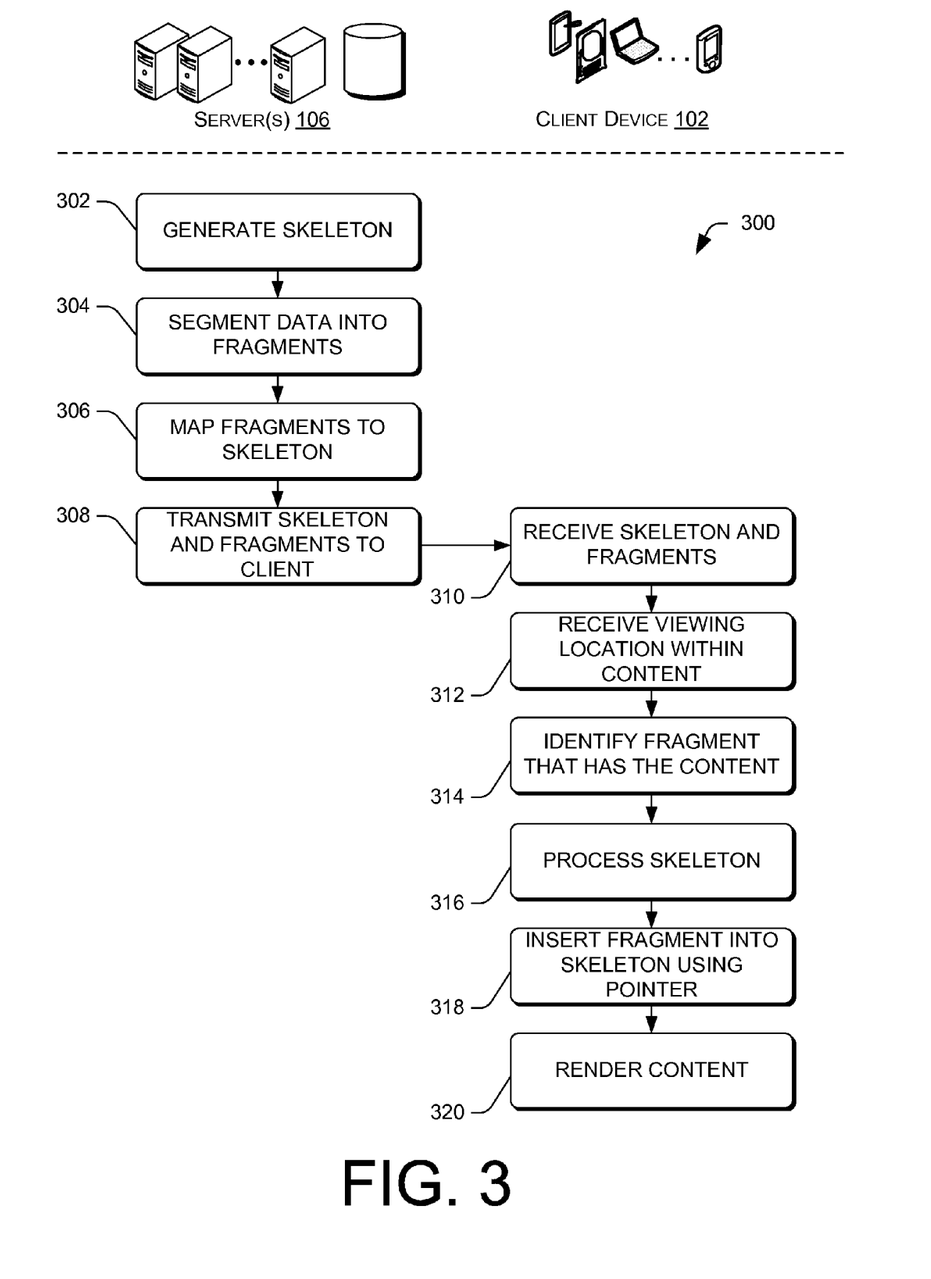
FIG. 3 is a flow diagram of an illustrative process to generate a formatting skeleton and fragments from structured language data and then render content from at least one of the fragments using the formatting skeleton.

FIG. 3 is a flow diagram of an illustrative process 300 to generate the skeleton 116 and the fragments 114 from structured language data 112 and then render content from at least one of the fragments using the formatting skeleton. The process 300 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions stored on one or more computer storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 300, shall be interpreted accordingly.

The process 300 is described with reference to components described with reference to FIG. 1, such as the server(s) 106 and the client device 102 that may perform the various operations. However, the operations may be performed by other components or interchanged among these components in various implementations.

At 302, the server(s) 106 may generate, via the skeleton module 136, the skeleton 116 from formatting information in the structured language data 112. For example, the skeleton module 136 may analyze the structured language document to identify and then extract at least a portion of the formatting information, which is used to generate the skeleton.

At 304, the server(s) 106 may generate, via the fragment module 138, the fragments 114 by segmenting the presentation data in the structured language data 112 into segments that are stored as the fragments. In some embodiments, the fragment module 138 may perform fragmentation of the presentation data to generate the fragments where each fragment has a byte size that is constrained within a predetermined threshold byte size range. In various embodiments, the fragment module 138 may extract (remove) the fragments 114 from the structured language data 112 and leave behind the formatting information of the skeleton 116.

At 306, the server(s) 106 may map the fragments 114 to the skeleton 116. For example, the fragmentation module 138 may generate the pointer 214 to map the fragment 202 to the skeleton 116 as described in the process 200. In some embodiments, the fragment module 138 may include a skeleton ID 212 in the fragment 202 to match the fragment to a specific skeleton having the skeleton ID 212. The skeleton ID 212 may be useful when the skeleton module 136 generates multiple skeletons and/or sub-skeletons at the operation 302, which is further discussed with reference to FIG. 4.

At 308, the server(s) 106 may transmit the skeleton 116 and the fragments 114 to the client device 102 for further processing. In some embodiments, the skeleton 116 and the fragments 114 of each piece of content (e.g., an eBook, newspaper, etc.) may be stored as a database for the transmission to the client device 102.

At 310, the client device 102 may receive the skeleton 116 and the fragments 114, which may be packaged as a database.

At 312, the client device 102, via the rendering manager 128, may receive a specified viewing location within the content. For example, the user 104 may specify a location within the content, such as by entering a byte position, selecting a link from a table of contents, an index, or by other inputs.

At 314, the rendering manager 128 may identify a fragment that is associated with the specified viewing location. In some embodiments, the rendering module 128 may compare an inputted byte position associated with the operation 312 to a position 206 of each of the fragments 114 to identify the fragment 202 that corresponds to the request at the operation 312.

At 316, the rendering manager 128 may process the skeleton 116, such as by parsing the formatting information to generate a DOM with nodes. By processing the skeleton 116, the rendering manager 128 may accurately lay out the format of the content of the structured language data while excluding, at least temporarily, some of the presentation data.

At 318, the rendering manager 128 may insert (or load) the fragment 202 with the skeleton 116 at a position specified by the pointer 214. In some embodiments, the rendering manager 128 may also map the fragment 202 to the skeleton 116 via the skeleton ID 212.

At 320, the rendering manager 128 may render the content, such as by painting the screen of the client device 102 in accordance with the formatting information from the skeleton 116 and the presentation data from the fragment 202, thereby enabling the user 104 to view an accurate representation of the content that is consistent with the structured language data 112 without processing all the fragments 114 and, therefore, without user-perceived latency by the client device 102.

In some embodiments, some or all of the operations 302-306 may be performed by the client device 102. For example, the client device 102 may obtain the structured language data 112 and then perform the operation 302-306 to create the skeleton 116 and the fragments, and thereby expedite a later user-initiated access of the content.

Illustrative Generation of Fragments and a Skeleton

Figure 4:
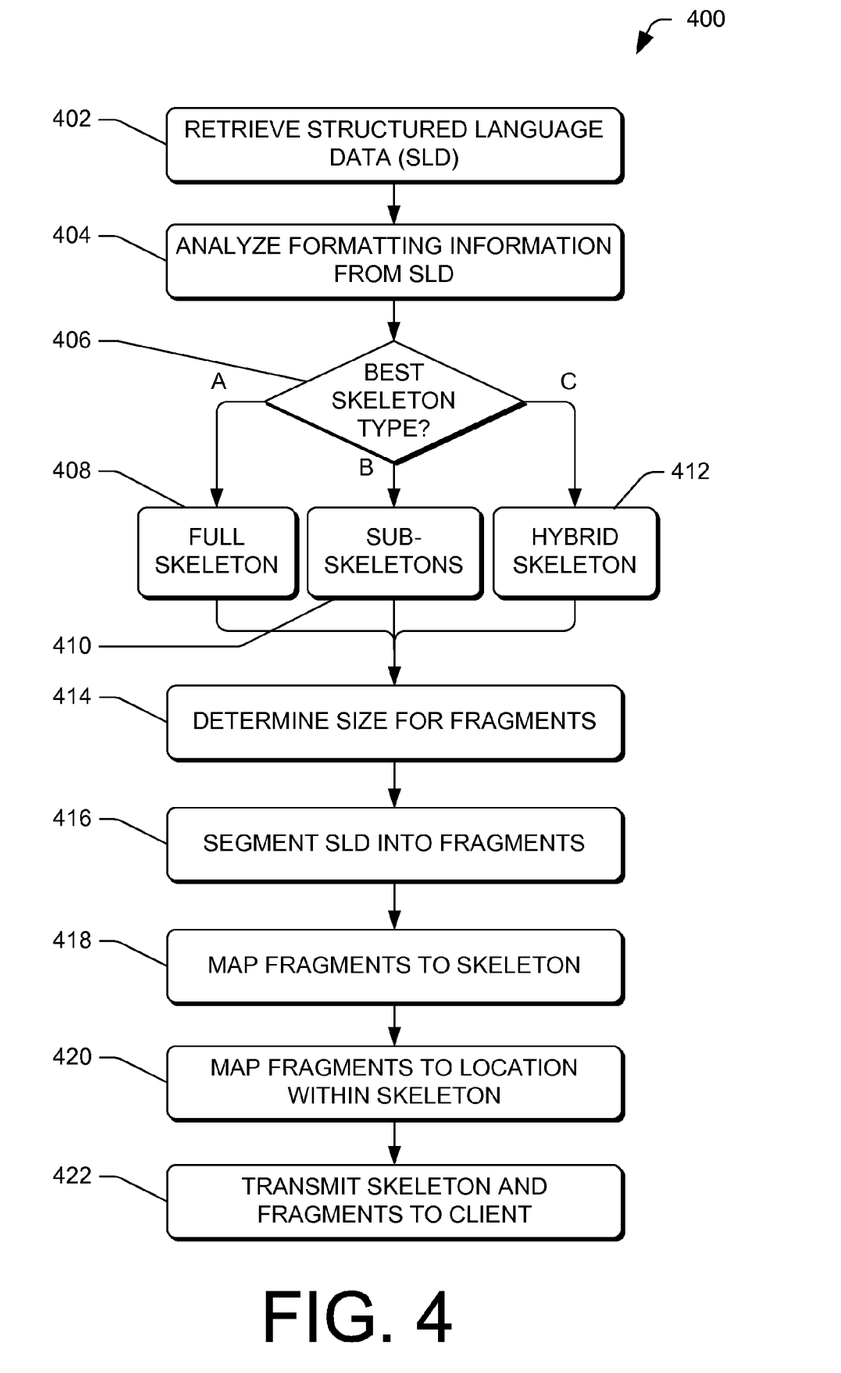
FIG. 4 is a flow diagram of another illustrative process to generate the formatting skeleton and the fragments from the structured language data.

FIG. 4 is a flow diagram of another illustrative process 400 to generate the formatting skeleton and the fragments from the structured language data 112. The process 400 is described with reference to the fragmentation manager 134 of the server(s) 106; however, some or all of the operations of the process 400 may also be performed by the client device 102.

At 402, the fragmentation manager 134 may retrieve the structured language data 112, such as from the data store 110.

At 404, the skeleton module 136 may analyze the formatting information of the structured language data 112. The analysis may determine a possible size of a skeleton, which may be generated from the structured language data 112.

At 406, the skeleton module 136 may determine a skeleton type to generate based on the analysis of the formatting information at the operation 404. In some embodiments, the skeleton module 136 may generate a full skeleton that includes all of the formatting information. For example, when the analysis at the operation 404 determines that the byte size necessary to store a full skeleton does not exceed a threshold size, then the decision at 406 may initiate generation of the full skeleton at 408. However, in some embodiments, the full skeleton may exceed the threshold size, in which case the skeleton module 136 may decide to generate sub-skeletons and/or a hybrid skeleton.

In various embodiments, the sub-skeletons are divisions of the full skeleton that may be parsed to create an accurate formatting of the presentation data without parsing another skeleton. Rather than creating a single full skeleton at 408, the skeleton module 136 may create smaller skeletons that may be used independently from one another and still enable accurate rendering of at least a portion of the presentation data. For example, a first part of the formatting information may be stored by a first sub-skeleton, which may include a size that does not exceed the threshold size. Similarly, the last part of the formatting information may be stored by a last sub-skeleton. For instance, in the context of an eBook, sub-skeletons may be used to store formatting information for chapters of the eBook although other divisions of the skeleton may be used. The fragments 114 may be assigned to the respective sub-skeletons (still referred to as the skeleton 116 for reference purposes). The skeleton module 136 may generate the sub-skeleton at 410.

The hybrid skeleton may be a skeleton that selectively excludes some of the formatting information from the structured language data 112. The hybrid skeleton may rely on the fragments to supplement any missing formatting information once the fragment is combined with the hybrid skeleton. Thus, the hybrid skeleton is a skeleton that allows nodes to by dynamically added to by the fragments. For example, the hybrid skeleton may define a table (e.g., <table>, </table>), while the fragment defines the row and column structure within the table. The skeleton module 136 may generate the hybrid skeleton at 412.

Each of the full skeleton, sub-skeletons, and the hybrid skeletons are variations of the skeleton 116 described herein and may be used interchangeably to enable the client device 102 to render one or more of the fragments 114 for viewing by the user 104.

At 414, the fragment module 138 may determine a fragment size for the fragments, and thus determine how to create each division (fragment) of the presentation data of the structured language data 112. In some embodiments, the fragment module 138 may determine a minimum fragment size necessary to fill a viewport of the client device 102 (or an average sized viewport for an unknown client device, etc.). The fragments size may be used to define a threshold size range for the fragments.

At 416, the fragment module 138 may divide the presentation data of the structured language data 112 to generate the fragments 114 that are within the threshold size range. However, in some instances the size of a fragment may be constrained by a particular instance of the presentation data (e.g., a very long paragraph, etc.), and thus fall outside of the threshold size range. These exceptional fragments may still be generated and used by the fragment module 138.

At 418, the fragment module 138 may map each of the fragments 114 to an associated skeleton using the skeleton ID 212. For example, when the skeleton module generates the skeleton(s) at one or more of the operations 408-412, the skeleton(s) may be assigned the skeleton ID 212 via the map 208. Each of the fragments may then be assigned to an associated skeleton by way of the skeleton ID 212.

At 420, the fragment module 138 may map the fragments to a location within the skeleton 116. In some embodiments, each of the fragments 114 may include the map 208 that specifies the pointer 214 for each respective fragment to map the fragment to a specific location in an associated skeleton (e.g., node within the DOM, etc.).

At 422, the fragmentation manager 134 may transmit the content, which includes the skeleton 116 and the fragments 114 to the client device 102. In some embodiments, the fragmentation manager 134 may transmit the content on a per-request basis, and thus only transmit some of the fragments to the client device 102. For example, when the server(s) 106 retain the content and provide a portion of the content to the client device 102 over the network(s) 108, the server(s) may only provide some of the fragments to the client device based on a request to reduce transmission time of the requested content. In this way, the server(s) 106 may provide a portion of the content to the client device 102 in an expedited manner using the skeleton 116 and the fragments 114 without necessarily transmitting all of the fragments to the client device 102.

Illustrative Rendering of the Fragments Using the Skeleton

Figure 5:
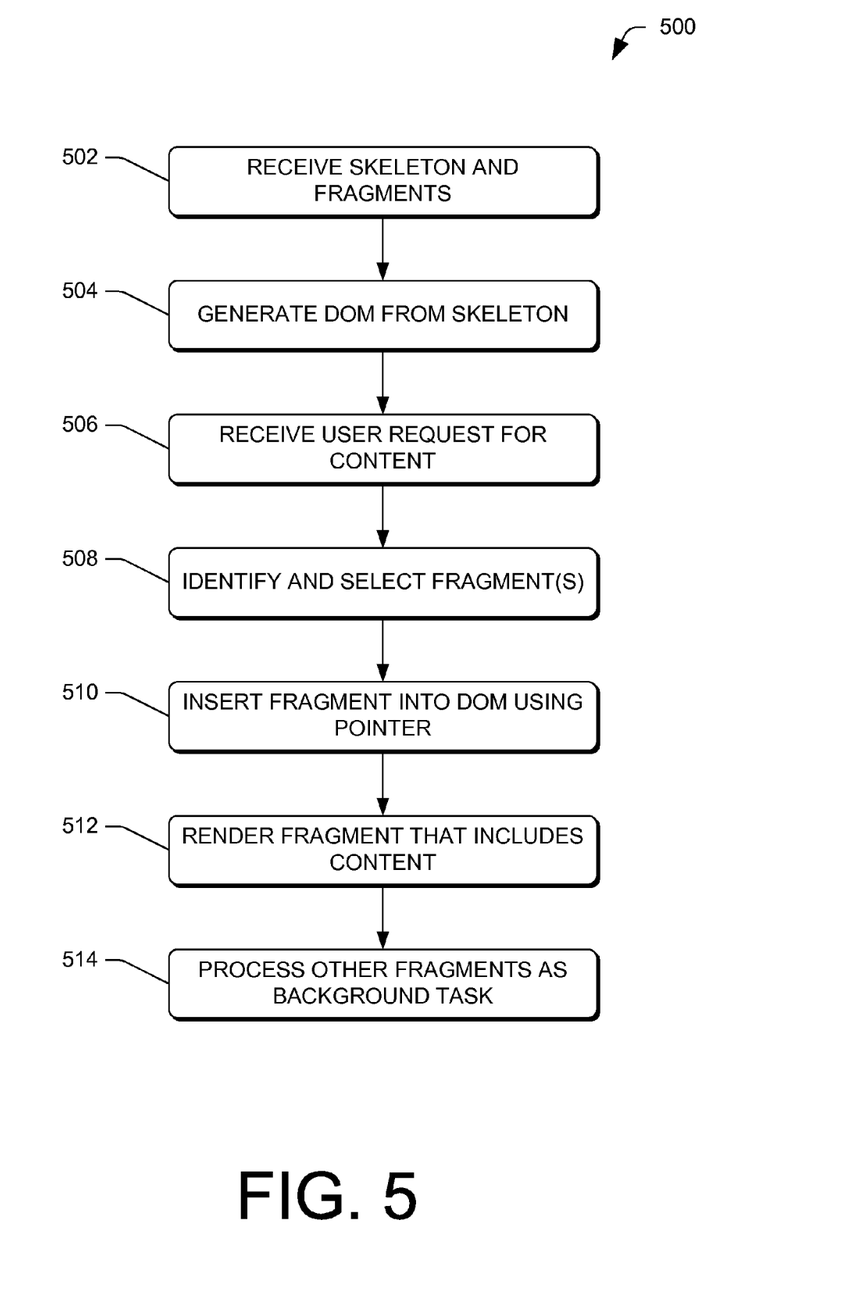
FIG. 5 is a flow diagram of yet another illustrative process to render content from at least one of the fragments using the formatting skeleton.

FIG. 5 is a flow diagram of yet another illustrative process 500 to render content from at least one of the fragments using the formatting skeleton. The process 500 is described with reference to the rendering manager 128 of the client device; however, some or all of the operations of the process 500 may also be performed by the server(s) 106. As discussed above and applicable to all the processes discussed herein, the order in which the operations are described is not intended to be construed as a limitation and any number of the described blocks can be combined in any order and/or in parallel to implement the process.

At 502, the client device 102 may receive the skeleton 116 and at least a portion of the fragments 114 from the server(s) 106. In some embodiments, the client device 102 may receive a database or other collection of data and/or files from the server(s) 106 that includes the skeleton 116 and the fragments 114. In various embodiments, the client device 102 may receive only a portion of the fragments 114 and the skeleton 116 from the server(s), such as when the client device relies on the server(s) 106 to provide the content on a per request basis over the network 108. For example, the client device 102 may obtain the content during a web-based interaction with the server(s) 106. The server(s) may provide fragments in response to individual requests for portions of content (fragments) from the client device rather than transmitting all of the fragments 114 to the client device 102 in a single transmission.

At 504, the client device 102, via the rendering manager 128, may generate a document object model (DOM) using the formatting instructions of the skeleton 116. The rendering manager 128 may parse and load the DOM for later use. The DOM may include nodes that are subsets of the DOM that, when populated with presentation data in the fragments 114, contain text, images, video application, or other content. When generated, the DOM enables accurate rendering of a portion of the fragments and thereby preserves the intended format of a specified viewing location of the rendered content.

At 506, the rendering manager 128 may receive a request from the user 104 for a specified viewing location within the content. For example, the user 104 may specify a byte position as the viewing location. In some instances, the user may select a link or other option from a list, such as a table of contents, index, or other list, which may then map to a byte position (or other position designator) that specifies a location within the content.

At 508, the rendering manager 128 may identify and select one or more fragment(s) based on the request from the operation 506. For example, the rendering manager 128 may identify a fragment that includes a byte position as the position 206 in the fragment 202. In some embodiments, the rendering manager 128 may select multiple of the fragments 114, such as to fill a viewport of the client device 102, when the rendering manager 128 renders presentation data of the fragments.

At 510, the rendering manager 128 may insert the fragment(s) into the DOM based on the pointer 214. In some embodiments, the DOM and fragment(s) may be loaded together during a rendering of the content. For example, the rendering manager 128 may identify a location of the presentation data of the fragment(s) and combine it with the formatting information from the skeleton 116, which is reflected in the DOM. In some embodiments, the fragment(s) may include some formatting instructions, such as when the skeleton is a hybrid skeleton and does not include all the formatting information, but instead relies on the fragment(s) to include some intermediate formatting information.

At 512, the rendering manager 128 may render the fragment(s) that includes the specified viewing location of the content. In some embodiments, the rendering manager 128 may parse the DOM and then load both the DOM and the fragment(s) to render the specified viewing location. In various embodiments, the rendering manager 128 may add the fragment(s) to the DOM, which may then be refreshed to show the content.

At 514, the rendering manager 128 may process as background tasks some or all of the fragments 114 that are not loaded and rendered at the operation 512. By performing the processing at the operation 514, the rendering manager 128 may anticipate a future request from the user 104 and have the content, or portion thereof, ready for expedited rendering for the user. In some embodiments, the rendering manager 128 may process fragments based on a likeliness of a request of the fragments, a proximity to the loaded fragment(s) at the operation 512 (before/after), or based on other criteria. The rendering manager 128 may identify associated fragments from the document, or other documents (e.g., via links, references, etc.). In various embodiments, the rendering manager 128 may use previous user inputs to determine fragments that the user (or other users) typically access following access of a particular fragment of the content. For example, the rendering manager 128 may access browsing history of the use that is associated with the content. This may be particularly helpful when the content is non-linear, such as a reference book or other type of content that users often jump around in navigation when interacting with the content.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
under control of one or more computer systems configured with executable instructions,
acquiring structured language data that includes presentation data that is integrated with formatting information used to format the presentation data;
extracting, into respective parts, the formatting information and the presentation data from the structured language data;
determining that a first byte size of a full skeleton exceeds a threshold size, wherein the full skeleton comprises an entirety of the formatting information;
determining, based at least in part on the first byte size, that a formatting skeleton of a reduced size hybrid skeleton type is to be created, wherein the formatting skeleton is a hybrid formatting skeleton that comprises a first portion of the formatting information and excludes a segment of the formatting information;
creating the formatting skeleton from at least a second portion of the formatting information extracted from the structured language data, the formatting skeleton comprising the first portion of the formatting information that, when combined with one or more reduced size hybrid skeleton type formatting skeletons, represents the entirety of the formatting instructions of the structured language data;
determining that a second byte size of the formatting skeleton is less than or equal to the threshold size;
dividing the presentation data into discrete segments;
creating the fragments from the discrete segments, each of the fragments including:
position information to identify the respective discrete segment of the presentation data contained in each fragment, wherein the position information comprises a byte position for the fragment;
a pointer to map each fragment to a respective portion of the formatting skeleton; and
a skeleton identifier to link each fragment to the formatting skeleton;
wherein the segment of the formatting information is included in a first fragment of the discrete segment; and
transmitting the formatting skeleton and the fragments to a client device.

2. The method as recited in claim 1, wherein the dividing the presentation data into discrete segments is based at least in part on a threshold byte size range.

3. The method as recited in claim 1, wherein the formatting skeleton, when parsed, creates a document object model that includes nodes, and wherein the fragments are mapped to the nodes via the pointer using XML Path Language (Xpath).

4. The method of claim 1, wherein the formatting skeleton excludes presentation data and is configured to be loaded, by a client device, separate from the presentation data.

5. The method of claim 1, wherein each of a subset of the fragments transmitted to the client device are configured to be loaded and rendered, by the client device, in accordance with the respective portions of the formatting skeleton mapped to by the pointer of the fragment to provide display of a specified viewing location corresponding to the subset of the fragments.

6. The method of claim 1, further comprising determining a fragment size for fragments to be created from the discrete segments.

7. The method of claim 6, further comprising determining a minimum fragment size necessary to fill a viewport of the client device, wherein the fragment size is equal to or greater than the minimum fragment size.

8. The method of claim 1, wherein the reduced size type is a sub-skeleton type and the formatting skeleton is a first sub-skeleton configured to be used independently from a second sub-skeleton.

9. The method of claim 8, wherein the first sub-skeleton corresponds to a first chapter of an electronic book and the second sub-skeleton corresponds to a second chapter of the electronic book.

10. A method comprising:
acquiring structured language data that includes presentation data that is integrated with formatting information used to format the presentation data;
determining that a first byte size of a full formatting skeleton exceeds a threshold size, wherein the full formatting skeleton comprises an entirety of the formatting information;
generating a hybrid formatting skeleton with a reduced size from at least a first portion of the formatting information extracted from the structured language data, wherein the hybrid formatting skeleton excludes a segment of the formatting information and comprises comprising a second portion of the formatting information that, when combined with other reduced size skeletons, represents the formatting information in the structured language data;
determining that a second byte size of the hybrid formatting skeleton is less than or equal to the threshold size; and
generating fragments, each of the fragments comprising:
at least a portion of the presentation data extracted from the structured language data,
a position identifier specifying a byte span for the fragment; and
a map to associate the fragment with a respective portion of the formatting skeleton;

wherein the segment of the formatting information is included in a first fragment of the fragments; and transmitting the hybrid formatting skeleton and the fragments to a client device.

11. The method as recited in claim 10, wherein the generating the fragments includes segmenting the at least a portion of the presentation data based at least in part on a threshold size range that determines how much of the presentation data to extract for each fragment.

12. The method as recited in claim 10, wherein the fragments further include a skeleton identifier to map the fragment to the hybrid formatting skeleton.

13. The method as recited in claim 10, wherein the hybrid formatting skeleton is a hybrid skeleton that omits some of the formatting information of the structured language data, and wherein the omitted formatting information is included in the fragments.

14. The method as recited in claim 10, wherein the byte span specifies a byte position for the fragment that enables determination of a start byte position and an end byte position associated with the fragment.

15. The method as recited in claim 10, wherein the fragments include the presentation data and intermediate formatting instructions embedded within the presentation data, the intermediate formatting instructions to further define the formatting instructions of the formatting skeleton.

16. The method as recited in claim 10, further comprising:
parsing and loading the hybrid formatting skeleton using a client device;
selecting at least one of the fragments based at least in part on the position identifier of the fragments; and
loading the at least one of the fragments with the hybrid formatting skeleton using the map to locate the fragment within the respective portion of the hybrid formatting skeleton.

17. One or more non-transitory computer-readable media storing computer-executable instructions that, when executed, cause one or more processors to perform acts comprising:

receiving structured language data that includes presentation data that is integrated with formatting information used to format the presentation data;

extracting, into respective parts, the formatting information and the presentation data from the structured language data;

determining that a first byte size of a full formatting skeleton exceeds a threshold size, wherein the full formatting skeleton comprises an entirety of the formatting information;

creating a hybrid formatting skeleton with a reduced size from at least a first portion of the formatting information extracted from the structured language data, wherein the hybrid formatting skeleton excludes a segment of the formatting information and comprises comprising a second portion of the formatting information that, when combined with other reduced size skeletons represents the formatting information in the structured language data;

determining that a second byte size of the hybrid formatting skeleton is less than or equal to the threshold size;

dividing the presentation data into discrete segments; and creating fragments from the discrete segments, each of the fragments comprising:

an amount of content that is optimized to fill an available display area of a display; and position information specifying a byte span for the fragment;

wherein the segment of the formatting information is included in a first fragment of the discrete segment; and transmitting the hybrid formatting skeleton and at least a portion of the fragments to a client device.

18. The one or more non-transitory computer-readable media as recited in claim 17, wherein the fragments include:
a pointer to map each fragment to a respective portion of the hybrid formatting skeleton; and
a skeleton identifier to link each fragment to the hybrid formatting skeleton.

* * * * *